US008352249B2

(12) United States Patent
Chong et al.

(10) Patent No.: US 8,352,249 B2
(45) Date of Patent: Jan. 8, 2013

(54) ENCODING DEVICE, DECODING DEVICE, AND METHOD THEREOF

(75) Inventors: Kok Seng Chong, Singapore (SG); Koji Yoshida, Kanagawa (JP); Masahiro Oshikiri, Kanagawa (JP)

(73) Assignee: Panasonic Corporation, Osaka (JP)

( * ) Notice: Subject to any disclaimer, the term of this patent is extended or adjusted under 35 U.S.C. 154(b) by 377 days.

(21) Appl. No.: 12/740,727

(22) PCT Filed: Nov. 4, 2008

(86) PCT No.: PCT/JP2008/003166

§ 371 (c)(1), (2), (4) Date: Apr. 30, 2010

(87) PCT Pub. No.: WO2009/057329

PCT Pub. Date: May 7, 2009

(65) Prior Publication Data

US 2010/0262421 A1 Oct. 14, 2010

(30) Foreign Application Priority Data

Nov. 1, 2007 (JP) ................................ 2007-285607

(51) Int. Cl.

| | |
|---|---|
| ***G06F 15/00*** | (2006.01) |
| ***G10L 11/00*** | (2006.01) |
| ***G10L 19/00*** | (2006.01) |
| ***G10L 19/14*** | (2006.01) |
| ***G10L 21/02*** | (2006.01) |

(52) U.S. Cl. ..................... 704/200; 704/200.1; 704/205; 704/211; 704/220; 704/225; 704/226; 704/227

(58) Field of Classification Search .................. 704/200, 704/200.1, 205, 211, 220, 225, 226, 227
See application file for complete search history.

(56) References Cited

U.S. PATENT DOCUMENTS

| | | | | |
|---|---|---|---|---|
| 4,797,929 | A * | 1/1989 | Gerson et al. | 704/243 |
| 5,819,212 | A * | 10/1998 | Matsumoto et al. | 704/219 |
| 6,081,784 | A * | 6/2000 | Tsutsui | 704/501 |

(Continued)

FOREIGN PATENT DOCUMENTS

| | | |
|---|---|---|
| JP | 08-123488 | 5/1996 |

(Continued)

OTHER PUBLICATIONS

3 GPP TS 26.290 "Extended Adaptive Multi-Rate Wideband Speech Codec (AMR-WB+)", pp. 1-86, 2005.

(Continued)

*Primary Examiner* — Eric Yen

(74) *Attorney, Agent, or Firm* — Greenblum & Bernstein, P.L.C.

(57) ABSTRACT

An encoding device improves the sound quality of a stereo signal while maintaining a low bit rate. The encoding device includes: an LP inverse filter which LP-inverse-filters a left signal L(n) by using an inverse quantization linear prediction coefficient AdM(z) of a monaural signal; a T/F conversion unit which converts the left sound source signal Le(n) from a temporal region to a frequency region; an inverse quantizer which inverse-quantizes encoded information Mqe; spectrum division units which divide a high-frequency component of the sound source signal Mde(f) and the left signal Le(f) into a plurality of bands; and scale factor calculation units which calculate scale factors ai and ssi by using a monaural sound source signal Mdeh,i(f), a left sound source signal Leh,i(f), Mdeh,i(f), and right sound source signal Reh,i(f) of each divided band.

7 Claims, 12 Drawing Sheets

U.S. PATENT DOCUMENTS

| | | | | |
|---|---|---|---|---|
| 6,456,968 | B1 * | 9/2002 | Taniguchi et al. | 704/229 |
| 6,629,078 | B1 | 9/2003 | Grill et al. | |
| 7,020,291 | B2 * | 3/2006 | Buck et al. | 381/92 |
| 7,069,223 | B1 * | 6/2006 | Matsumoto et al. | 704/500 |
| 7,318,035 | B2 * | 1/2008 | Andersen et al. | 704/500 |
| 7,542,896 | B2 * | 6/2009 | Schuijers et al. | 704/201 |
| 7,627,480 | B2 * | 12/2009 | Ojanpera | 704/500 |
| 7,630,882 | B2 * | 12/2009 | Mehrotra et al. | 704/205 |
| 7,742,912 | B2 * | 6/2010 | Den Brinker | 704/200.1 |
| 7,809,579 | B2 * | 10/2010 | Bruhn et al. | 704/500 |
| 7,822,617 | B2 * | 10/2010 | Taleb et al. | 704/501 |
| 7,885,819 | B2 * | 2/2011 | Koishida et al. | 704/500 |
| 7,941,319 | B2 * | 5/2011 | Nomura et al. | 704/500 |
| 7,965,848 | B2 * | 6/2011 | Villemoes et al. | 381/22 |
| 7,974,417 | B2 * | 7/2011 | Kim et al. | 381/1 |
| 8,069,050 | B2 * | 11/2011 | Thumpudi et al. | 704/500 |
| 8,160,258 | B2 * | 4/2012 | Jung et al. | 381/2 |
| 2004/0158456 | A1 * | 8/2004 | Prakash et al. | 704/200.1 |
| 2005/0157884 | A1 | 7/2005 | Eguchi | |
| 2006/0215683 | A1 * | 9/2006 | Sukkar et al. | 370/437 |
| 2007/0016416 | A1 * | 1/2007 | Roden et al. | 704/230 |
| 2008/0177533 | A1 * | 7/2008 | Teo et al. | 704/207 |
| 2010/0017200 | A1 | 1/2010 | Oshikiri et al. | |
| 2010/0100372 | A1 | 4/2010 | Zhou et al. | |
| 2010/0121632 | A1 | 5/2010 | Chong | |
| 2010/0161323 | A1 | 6/2010 | Oshikiri | |
| 2010/0169081 | A1 | 7/2010 | Yamanashi et al. | |

FOREIGN PATENT DOCUMENTS

| | | |
|---|---|---|
| JP | 10-051313 | 2/1998 |
| JP | 2001-255892 | 9/2001 |
| JP | 2001-282290 | 10/2001 |
| JP | 2005-202248 | 7/2005 |
| JP | 2006-345063 | 12/2006 |
| WO | 2006/121101 | 11/2006 |
| WO | 2007/088853 | 8/2007 |

OTHER PUBLICATIONS

Jurgen Herre, “From Joint Stereo to Spatial Audio Coding—Recent Progress and Standardization,” Proc. of the 7$^{th}$ Int'l. Conference on Digital Audio Effects, Naples, Italy, Oct. 5-8, 2004.

Bosi M et al., “ISO/IEC MPEG-2 Advanced Audio Coding”, Journal of the Audio Engineering Society, Audio Engineering Society, New York, NY, US, vol. 45, No. 10, Oct. 1, 1999, XP000730161, pp. 789-812.

Search report from E.P.O., mail date is Sep. 2, 2011.

* cited by examiner

ENCODING DEVICE, DECODING DEVICE, AND METHOD THEREOF

TECHNICAL FIELD

The present invention relates to a coding apparatus and a decoding apparatus and these coding and decoding methods that apply intensity stereo to transform-coded excitation (TCX) codecs.

BACKGROUND ART

In conventional speech communications systems, monaural speech signals are transmitted under the constraint of limited bandwidth. Accompanying development of broadband on communication networks, users' expectation for speech communication has moved from mere intelligibility toward naturalness, and a trend to provide stereophonic speech has emerged. In this transitional points where monophonic systems and stereophonic systems are both present, it is desirable to achieve stereophonic communication while maintaining downward compatibility with monophonic systems.

To achieve the above-described target, it is possible to build a stereophonic speech coding system on monophonic speech codec. With monophonic speech codec, a monaural signal generated by downmixing a stereophonic signal is usually encoded. In the stereo speech coding system, a stereophonic signal is recovered by applying additional processes to a monaural signal decoded in a decoder.

There are a large number of related arts that realize stereo coding while maintaining downward compatibility with monophonic codec. FIGS. 9 and 10 show a coding apparatus and a decoding apparatus in general transform-coded excitation (TCX) codec, respectively. AMR-WB+ is known as a known codec employing an advanced modification of TCX (see Non-Patent Document 1).

In the coding apparatus shown in FIG. 9, first, adder 1 and multiplier 2 transform left signal L(n) and right signal R(n) in a stereo signal into monaural signal M(n), and subtractor 3 and multiplier 4 transform the left signal and the right signal into side signal S(n) (see equation 1).

[1]

$$M(n)=(L(n)+R(n))\cdot 0.5$$

$$S(n)=(L(n)-R(n))\cdot 0.5 \qquad \text{(Equation 1)}$$

Monaural signal M(n) is transformed into an excitation signal $M_e(n)$ by a linear prediction (LP) process. Linear prediction is very commonly used in speech coding to separate a speech signal into formant components (parameterized by linear prediction coefficients) and excitation components.

Further, monaural signal M(n) is subject to LP analysis in LP analysis section 5, to generate linear prediction coefficients $A_M(z)$. Quantizer 6 quantizes and encodes linear prediction coefficients $A_m(z)$, to acquire coded information $A_{qM}$. Further, dequantizer 7 dequantizes the coded information $A_{qM}$, to acquire linear prediction coefficients $A_{dM}(z)$. LP inverse filter 8 performs LP inverse filtering process on monaural signal M(n) using linear prediction coefficients $A_{dM}(z)$, to acquire monophonic excitation signal $M_e(n)$.

When coding is carried out at a low bit rate, excitation signal $M_e(n)$ is encoded using an excitation codebook (see Non-Patent Document 1). When coding is carried out at a high bit rate, T/F transformation section 9 time-to-frequency transforms time-domain monaural excitation signal $M_e(n)$ into frequency-domain $M_e(f)$. Either discrete Fourier transform (DFT) or modified discrete cosine transform (MDCT) can be employed for this purpose. In the case of MDCT, it is necessary to concatenate two signal frames. Quantizer 10 quantizes part of frequency-domain excitation signal $M_e(f)$, to form coded information $M_{qe}$. Quantizer 10 is able to further compress the amount of quantized coded information using a lossless coding method such as Huffman Coding.

Side signal S(n) is subject to the same series of processes as monaural signal M(n). LP analysis section 11 performs an LP analysis on side signal S(n), to generate linear prediction coefficients $A_s(z)$. Quantizer 12 quantizes and encodes linear prediction coefficients $A_s(z)$, to acquire coded information $A_{qS}$. Dequantizer 13 dequantizes coded information $A_{qS}$, to acquire linear prediction coefficients $A_{ds}(z)$. LP inverse filter 14 performs LP inverse filtering process on side signal S(n) using linear prediction coefficients $A_{ds}(z)$, to acquire side excitation signal $S_e(n)$. T/F transformation section 15 time-to-frequency transforms time-domain side excitation signal $S_e(n)$ into frequency-domain side excitation signal $S_e(f)$. Quantizer 16 quantizes part of the frequency-domain side excitation signal $S_e(f)$, to form coded information $S_{qe}$. All quantized and coded information is multiplexed in multiplexing section 17, to form a bit stream.

When monophonic decoding is performed in a decoding apparatus shown in FIG. 10, coded information $A_{qM}$ of linear prediction coefficients and coded information $M_{qe}$ of frequency-domain monaural excitation signal are demultiplexed and processed from the bit stream in demultiplexing section 21. Dequantizer 22 decodes and dequantizes coded information $A_{qM}$, to acquire linear prediction coefficients $A_{dM}(z)$. Meanwhile, dequantizer 23 decodes and dequantizes coded information $M_{qe}$, to acquire monophonic excitation signal $M_{de}(f)$ in the frequency domain. F/T transformation section 24 transforms frequency-domain monophonic excitation signal $M_{de}(f)$ into time-domain $M_{de}(n)$. LP synthesis section 25 performs LP synthesis on $M_{de}(n)$ using linear prediction coefficients $A_{dM}(z)$, to recover monaural signal $M_d(n)$.

When stereo decoding is carried out, information about the side signal is demultiplexed from a bit stream in demultiplexing section 21. The side signal is subject to the same series of processes as the monaural signal. That is, the processes are: decoding and dequantizing for coded information $A_{qS}$ in dequantizer 26; lossless-decoding and dequantizing for coded information $S_{qe}$ in dequantizer 27; F/T transformation from the frequency domain to the time domain in F/T transformation section 28; and LP synthesis in LP synthesis section 29.

Upon recovering monaural signal $M_d(n)$ and side signal $S_d(n)$, adder 30 and subtractor 31 can recover left signal $L_{out}(n)$ and right signal $R_{out}(n)$ as following equation 2.

[2]

$$L_{out}(n)=M_d(n)+S_d(n)$$

$$R_{out}(n)=M_d(n)-S_d(n) \qquad \text{(Equation 2)}$$

Another example of a stereo codec with downward compatibility with monophonic systems employs intensity stereo (IS). Intensity stereo provides an advantage of realizing very low coding bit rates. Intensity stereo utilizes psychoacoustic property of the human ear, and therefore is regarded as a perceptual coding tool. At frequency about 5 kHz or more, the human ear is insensitive to the phase relationship between the left and right signals. Accordingly, although the left and right signals are replaced with monaural signals set up to the same energy level, the human perceives almost the same stereo sensation of the original signals. With intensity stereo, to preserve the original stereo sensation in the decoded signals, only monaural signals and scale factors need to be encoded. Since the side signals are not encoded, and therefore it is possible to decrease the bit rate. Intensity Stereo is used in MPEG2/4 AAC (See Non-Patent Document 2).

FIG. 11 shows a block diagram showing the configuration of a general coding apparatus using intensity stereo. time-domain left signal L(n) and right signal R(n) are subject to time-to-frequency transformation in T/F transformation sections 41 and 42, to make frequency-domain L(f) and R(f), respectively. Adder 43 and multiplier 44 transform frequency-domain left signal L(f) and right signal R(f) to frequency-domain monaural signal M(f), and subtractor 45 and multiplier 46 transform frequency-domain left signal L(f) and right signal R(f) to frequency-domain side signal S(f) (equation 3).

[3]

$$M(f)=V(f)+R(f))\cdot 0.5$$

$$S(f)=V(f)-R(f))\cdot 0.5 \quad \text{(Equation 3)}$$

Quantizer 47 quantizes and performs lossless coding on M(f), to acquire coded information $M_g$. It is not appropriate to apply intensity stereo to a low frequency range, and therefore spectrum split section 48 extracts the low frequency part of S(f) (i.e. the part lower than 5 kHz). Quantizer 49 quantizes and performs lossless coding on the extracted low frequency part, to acquire coded information $S_{q1}$.

To compute the scale factors for intensity stereo, the high frequency parts of left signal L(f), right signal R(f) and monaural signal M(f) are extracted from spectrum split sections 51, 52 and 53, respectively. These outputs are represented by $L_h$(f), $R_h$(f) and $M_h$(f). Scale factor calculation sections 54 and 55 calculate the scale factor for the left signal, α, and the scale factor for the right signal, β, respectively, by the following equation 4.

(Equation 4)

[4]

$$\alpha=\sqrt{\sum_{f>5khz} L_h^2(f) \Big/ \sum_{f>5khz} M_h^2(f)}$$

$$\beta=\sqrt{\sum_{f>5khz} R_h^2(f) \Big/ \sum_{f>5khz} M_h^2(f)}$$

Quantizers 56 and 57 quantize scale factors α and β, respectively. Multiplexing section 58 multiplexes all quantized and encoded information, to form a bit stream.

FIG. 12 shows a block diagram showing a configuration of a general decoding apparatus using intensity stereo. First, demultiplexing section 61 demultiplexes all bit stream information. Dequantizer 62 performs lossless decoding and dequantizes a monaural signal, to recover frequency-domain monaural signal $M_d$(f). When only monaural decoding is carried out, $M_d$(f) is transformed into $M_d$(n), and the decoding process is finished.

When stereo decoding is carried out, spectrum split section 63 splits $M_d$(f) into high frequency components $M_{dh}$(f) and low frequency components $M_{d1}$(f). Further, when stereo decoding is carried out, dequantizer 64 performs lossless decoding and dequantizes low frequency part $S_{q1}$ of encoded information of the side signal, to acquire $S_{d1}$(f).

Adder 65 and subtractor 66 recover the low frequency parts of left and right signals $L_{d1}$(f) and $R_{d1}$(f) by following equation 5 using $M_{d1}$(f) and $S_{d1}$(f).

[5]

$$L_{d1}(f)=M_{d1}(f)+S_{d1}(f)$$

$$R_{d1}(f)=M_{d1}(f)-S_{d1}(f) \quad \text{(Equation 5)}$$

Dequantizers 67 and 68 dequantize scale factors for intensity stereo $\alpha_q$ and $\beta_q$, to acquire $\alpha_d$ and $\beta_d$, respectively. Multipliers 69 and 70 recover the high frequency parts $L_{dh}$(f) and $R_{dh}$(f) of the left and right signals using $M_{dh}$(f), $\alpha_d$ and $\beta_d$ by following equation 6.

[6]

$$L_{dh}(f)=M_{dh}(f)\cdot\alpha_d$$

$$R_{dh}(f)=M_{dh}(f)\cdot\beta_d \quad \text{(Equation 6)}$$

Combination section 71 combines the low frequency part $L_{d1}$(f) and the high frequency part $L_{dh}$ (f) of the left signal, to acquire full spectrum $L_{out}$(f) of the left signal. Likewise, combination section 71 combines low frequency part $R_{d1}$(f) and high frequency part $R_{dh}$(f) of the right signal, to acquire full spectrum $R_{out}$(f) of the right signal.

Finally, F/T transformation sections 73 and 74 frequency-to-time transform frequency-domain $L_{out}$(f) and $R_{out}$(f), to acquire time-domain $L_{out}$(n) and $R_{out}$(n).

Non-Patent Document 1: 3GPP TS 26.290 "Extended AMR Wideband Speech Codec (AMR-WB+)"
Non-Patent Document 2: Jurgen Herre, "From Joint Stereo to Spatial Audio Coding—Recent Progress and Standardization", Proc of the 7th International Conference on Digital Audio Effects, Naples, Italy, Oct. 5-8, 2004.

DISCLOSURE OF INVENTION

Problems to be Solved by the Invention

It is difficult to encode both $M_e$(n) and $S_e$(n) in high quality and at low bit rates. This problem can be explained with reference to AMR-WB+ (Non-Patent Document 1), which is related art.

With a high bit rate, a side excitation signal is transformed into a frequency domain (DFT or MDCT) signal, and the maximum band for coding is determined according to the bit rate in the frequency domain and encoded. With a low bit rate, the band for coding using transform coding is too narrow, coding using a codebook excitation scheme is carried out instead. According to this scheme, excitation signals are represented by codebook indices (which require only the very small number of bits). However, while the code excitation scheme performs well on speech signals, the sound quality for audio signals is not enough.

It is therefore an object of the present invention to provide a coding apparatus, a decoding apparatus and the coding and decoding methods that are able to improve the sound quality of stereo signals at low bit rates.

Means for Solving the Problem

The coding apparatus of the present invention adopts the configuration including: a monaural signal generation section that generates a monaural signal by combining a first channel signal and a second channel signal in an input stereo signal and generates a side signal, which is a difference between the first channel signal and the second channel signal; a first transformation section that transforms the time-domain monaural signal to a frequency-domain monaural signal; a second transformation section that transforms the time-domain side signal to a frequency-domain side signal; a first quantization section that quantizes the transformed frequency-domain monaural signal, to acquire a first quantization value; a second quantization section that quantizes low frequency part of the transformed frequency-domain side signal, the low frequency part being equal to or lower than a predetermined frequency, to acquire a second quantization value; a first scale factor calculation section that calculates a first energy ratio between high frequency part that is higher band than the predetermined frequency of the first channel signal and high frequency part that is higher band than the predetermined frequency of the monaural signal; a second scale factor calculation section that calculates a second energy ratio between high frequency part that is higher band than the predetermined frequency of the second channel signal and high frequency part that is higher band than the predetermined frequency of the monaural signal; a third quantization section that quantizes the first energy ratio to acquire a third quantization value; a fourth quantization section that quantizes the second energy ratio to acquire a fourth quantization value; and a transmitting section that transmits the first quantization value, the second quantization value, the third quantization value and the fourth quantization value.

The decoding apparatus of the present invention adopts the configuration including: a receiving section that receives: a first quantization value acquired by transforming to a frequency domain and quantizing a monaural signal generated by combining a first channel signal and a second channel signal in an input stereo signal; a second quantization value acquired by transforming a side signal to a frequency-domain side signal and quantizing low frequency part that is equal to or lower than a predetermined frequency of the frequency-domain side signal, the side signal being a difference between the first channel signal and the second channel signal; a third quantization value acquired by quantizing a first energy ratio, the first energy ratio being high frequency part that is higher band than the predetermined frequency of the first channel signal to high frequency part that is higher band than the predetermined frequency of the monaural signal; and a fourth quantization value acquired by quantizing a second energy ratio, the second energy ratio being high frequency part that is higher band than the predetermined frequency of the second channel signal to high frequency part that is higher band than the predetermined frequency of the monaural signal; a first decoding section that decodes the frequency-domain monaural signal from the first quantization value; a second decoding section that decodes the side signal in the low frequency part from the second quantization value; a third decoding section that decodes the first energy ratio from the third quantization value; a fourth decoding section that decodes the second energy ratio from the fourth quantization value; a first scaling section that scales the high frequency part of the frequency-domain monaural signal using the first energy ratio and the second energy ratio, to generate a scaled monaural signal; a second scaling section that scales the high frequency part of the frequency-domain monaural signal using the first energy ratio and the second energy ratio, to generate a scaled side signal; a third transformation section that transforms a signal combined between the scaled monaural signal and the monaural signal in low frequency part to a time-domain monaural signal; a fourth transformation section that transforms a signal combined between the scaled side signal and the side signal in the low frequency part to a time-domain side signal; and a decoding section that decodes a first channel signal and a second channel signal in a stereo signal using the time-domain monaural signal acquired in the third transformation section and the time-domain side signal acquired in the fourth transformation section, wherein the first scaling section and the second scaling section perform scaling using the first energy ratio and the second energy ratio such that the decoded first channel signal and the decoded second channel signal in the stereo signal have approximately the same energy as a first channel signal and a second channel signal in an input stereo signal.

The coding method of the present invention includes the steps of: a monaural signal generation step of generating a monaural signal by combining a first channel signal and a second channel signal in an input stereo signal and generating a side signal, which is a difference between the first channel signal and the second channel signal; a first transformation step of transforming the time-domain monaural signal to a frequency-domain monaural signal; a second transformation step of transforming the time-domain side signal to a frequency-domain side signal; a first quantization step of quantizing the transformed frequency-domain monaural signal, to acquire a first quantization value; a second quantization step of quantizing low frequency part of the transformed frequency-domain side signal, the low frequency part being equal to or lower than a predetermined frequency, to acquire a second quantization value; a first scale factor calculation step of calculating a first energy ratio between high frequency part that is higher band than the predetermined frequency of the first channel signal and high frequency part that is higher band than the predetermined frequency of the monaural signal; a second scale factor calculation step of calculating a second energy ratio between high frequency part that is higher band than the predetermined frequency of the second channel signal and high frequency part that is higher band than the predetermined frequency of the monaural signal; a third quantization step of quantizing the first energy ratio to acquire a third quantization value; a fourth quantization step of quantizing the second energy ratio to acquire a fourth quantization value; and a transmitting step of transmitting the first quantization value, the second quantization value, the third quantization value and the fourth quantization value.

The decoding method of the present invention includes the steps of: a receiving step of receiving: a first quantization value acquired by transforming to a frequency domain and quantizing a monaural signal generated by combining a first channel signal and a second channel signal in an input stereo signal; a second quantization value acquired by transforming a side signal to a frequency-domain side signal and quantizing low frequency part that is equal to or lower than a predetermined frequency of the frequency-domain side signal, the side signal being a difference between the first channel signal and the second channel signal; a third quantization value acquired by quantizing a first energy ratio, the first energy ratio being high frequency part that is higher band than the predetermined frequency of the first channel signal to high frequency part that is higher band than the predetermined frequency of the monaural signal; and a fourth quantization value acquired by quantizing a second energy ratio, the second energy ratio being high frequency part that is higher band than the predetermined frequency of the second channel signal to high frequency part that is higher band than the predetermined frequency of the monaural signal; a first decoding step of decoding the frequency-domain monaural signal from the first quantization value; a second decoding step of decoding the side signal in the low frequency part from the second quantization value; a third decoding step of decoding the first energy ratio from the third quantization value; a fourth decoding step of decoding the second energy ratio from the fourth quantization value; a first scaling step of scaling the high frequency part of the frequency-domain monaural signal using the first energy ratio and the second energy ratio, to generate a scaled monaural signal; a second scaling step of scaling the high frequency part of the frequency-domain monaural signal using the first energy ratio and the second energy ratio, to generate a scaled side signal; a third transformation step of transforming a signal combined between the scaled monaural signal and the monaural signal in low frequency part to a time-domain monaural signal; a fourth transformation step of transforming a signal combined between the scaled side signal and the side signal in the low frequency part to a time-domain side signal; and a decoding step of decoding a first channel signal and a second channel signal in a stereo signal using the time-domain monaural signal acquired in the third transformation step and the time-domain side signal acquired in the fourth transformation step, wherein, in the first scaling step and the second scaling step scaling is performed using the first energy ratio and the second energy ratio such that the decoded first channel signal and the decoded second channel signal in the stereo signal have approximately the same energy as a first channel signal and a second channel signal in an input stereo signal.

Advantageous Effects of Invention

The present invention realizes transform coding at low bit rates, so that it is possible to improve the sound quality of stereo signals while maintaining low bit rates.

BEST MODE FOR CARRYING OUT THE INVENTION

With the present invention, the majority of available bits are allocated to encode low frequency spectrums, and the minority of available bits are allocated to apply intensity stereo to high frequency spectrums.

To be more specific, with the present invention, intensity stereo is used to encode high frequency spectrums of side excitation signals in TCX-based codecs in the coding apparatus. Information on energy ratios between left and right excitation signals and monaural excitation signals are transmitted using the part of available bits. The decoding apparatus adjusts the energy of monaural excitation signals and side excitation signals in the frequency domain using scale factors calculated using the above energy ratios so that left and right signals finally recovered by a decoding process have approximately the same energy as original signals.

The present invention makes it possible to realize transform coding at low bit rates by applying intensity stereo utilizing psychoacoustic property of the human ear, so that the present invention improves sound quality of stereo signals while maintaining low bit rates.

In a TCX-based monaural/side signal coding framework, frequency-domain monaural/side signals transformed from excitation signals acquired by LP inverse filtering are quantized and encoded. Accordingly, in this coding framework, to directly form right and left signals by applying intensity stereo to monaural signals, a TCX decoding apparatus in a decoder needs to time-to-frequency transform right and left signals recovered from monaural/side signals into frequency-domain right and left signals once, scale high frequency bands of those signals using the time-to-frequency transformed recovered monaural signal, and then combine the scaled signals using the resulting signals as all band signals and frequency-to-time transforms the frequency-domain combined signals to time-domain signals again. As a result, the amount of calculation accompanied by new processes increases and additional delays accompanied by time-to-frequency transformation and frequency-to-time transformation are produced.

By scaling a recovered monaural excitation signal in the frequency domain, the present invention makes it possible to apply intensity stereo indirectly to frequency-domain side excitation, and therefore the amount of calculation accompanied by new processes does not increase and additional delays accompanied by time-to-frequency transformation and frequency-to-time transformation are not produced.

Further, the present invention enables intensity stereo to use together with other coding technologies including wideband extension technologies that accompany linear prediction and time-to-frequency transformation as part of processes.

Now, embodiments of the present invention will be described in detail with reference to the accompanying drawings.

Embodiment 1

Figure 1:
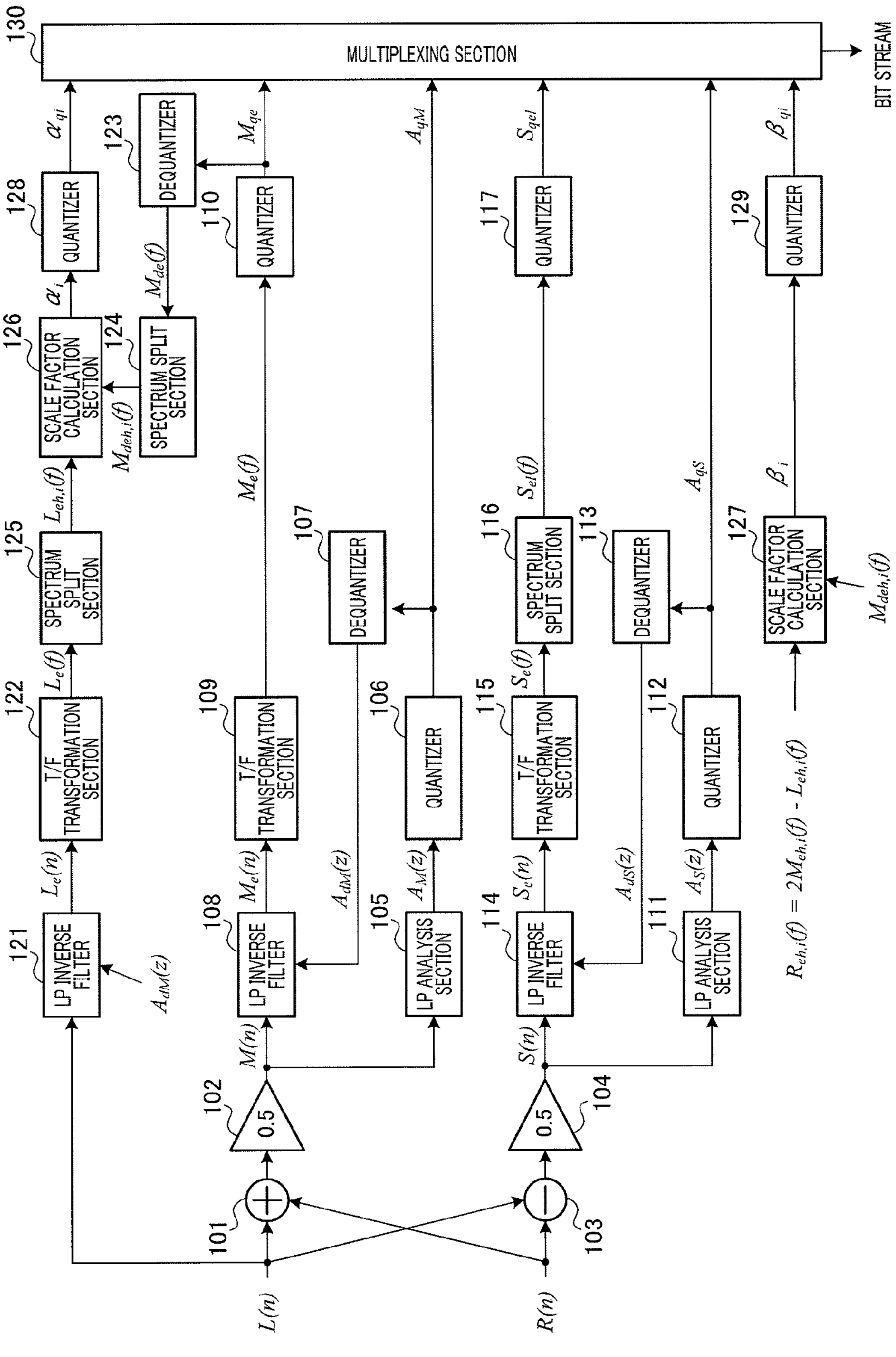
FIG. 1 is a block diagram showing a configuration of the coding apparatus according to Embodiment 1 of the present invention.
Figure 2:
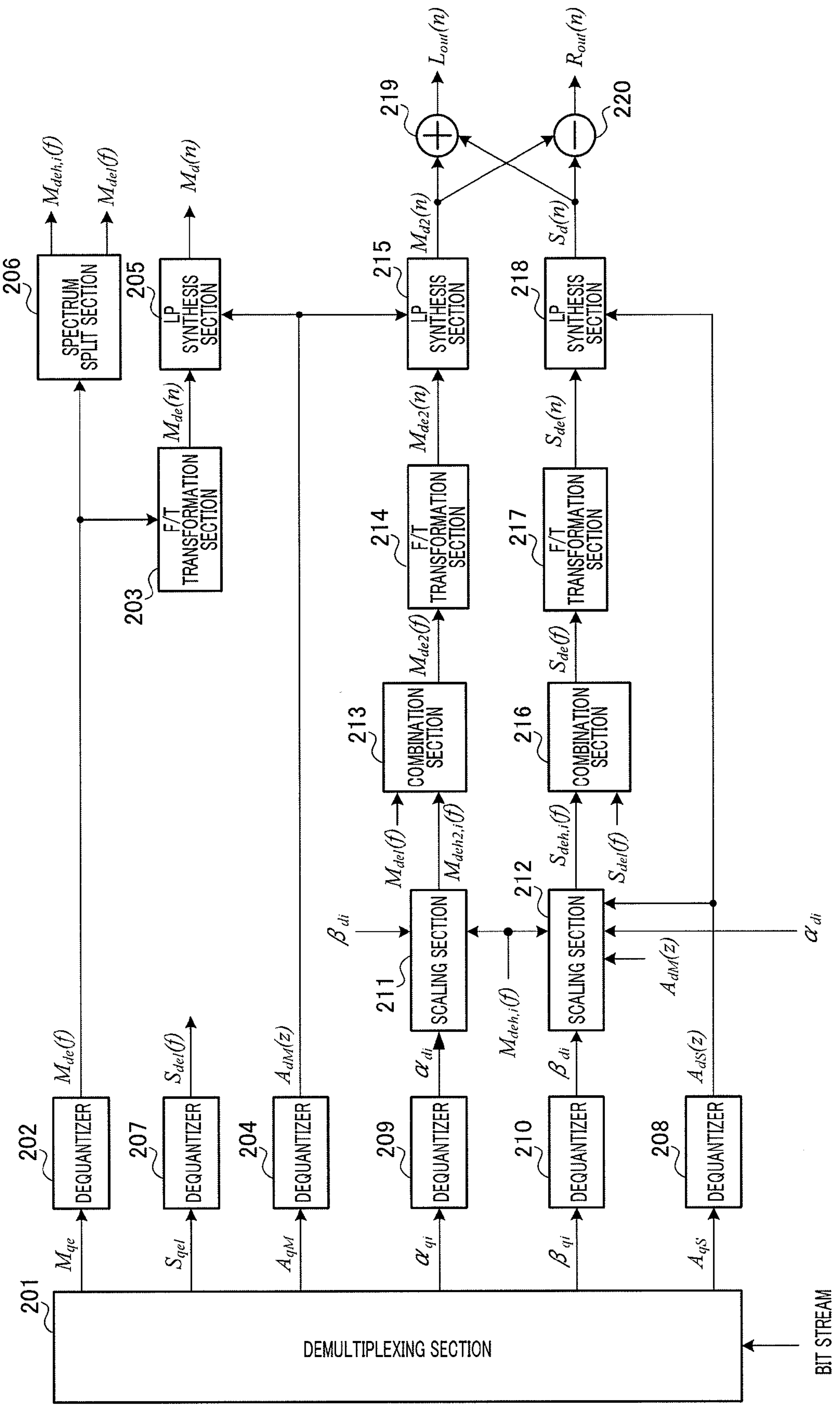
FIG. 2 is a block diagram showing a configuration of the decoding apparatus according to Embodiment 1 of the present invention.

FIG. 1 is a block diagram showing the configuration of the coding apparatus according to the present embodiment, and FIG. 2 is a block diagram showing the configuration of the decoding apparatus according to the present embodiment. Efforts such that an advantage in the present invention are obtained are added to a transform-coded excitation (TCX) coding scheme and intensity stereo, which are combined.

In the coding apparatus shown in FIG. 1, left signal L(n) and right signal R(n) are transformed into monaural signal M(n) in adder 101 and multiplier 102, and transformed into side signal S(n) in subtractor 103 and multiplier (see above equation 1).

LP analysis section 105 performs an LP analysis on monaural signal M(n), to generate linear prediction coefficients $A_M(z)$. Quantizer 106 quantizes and encodes linear prediction coefficients $A_m(z)$, to acquire coded information $A_{qM}$. Dequantizer 107 dequantizes coded information $A_{qM}$, to acquire linear prediction coefficients $A_{dM}(z)$. LP inverse filter 108 performs LP inverse filtering process on the monaural signal M(n) using linear prediction coefficients $A_{dM}(z)$, to acquire monaural excitation signal $M_e(n)$.

T/F transformation section 109 time-to-frequency transforms time-domain monaural excitation signal $M_e(n)$ into frequency-domain monaural signal $M_e(f)$. Either discrete Fourier transform (DFT) or modified discrete cosine transform (MDCT) can be used for this purpose. Quantizer 110 quantizes frequency-domain monaural signal $M_e(f)$, to form coded information $M_{qe}$.

Side signal S(n) is subject to the same series of processes as monaural signal M(n). That is, LP analysis section 111 performs an LP analysis on side signal S(n), to generate linear prediction coefficients $A_s(z)$. Quantizer 112 quantizes and encodes linear prediction coefficients $A_s(z)$, to acquire coded information $A_{qS}$. Dequantizer 113 dequantizes coded information $A_{qS}$, to acquire linear prediction coefficients $A_{dS}(z)$. LP inverse filter 114 performs LP inverse filtering process on side signal S(n) using linear prediction coefficients $A_{ds}(z)$, to acquire side excitation signal $S_e(n)$. T/F transformation section 115 time-to-frequency transforms time domain side excitation signal $S_e(n)$ to frequency domain side excitation signal $S_e(f)$. Spectrum split section 116 extracts low frequency part $S_{e1}(f)$ of the frequency domain side signal $S_{e1}(f)$, and quantizer 117 quantizes the extracted signal, to form coded information $S_{qe1}$.

To calculate scale factors of intensity stereo, LP inverse filter 121 and T/F transformation section 122 need to perform LP inverse filtering and time-to-frequency transformation on the left signal L(n) as on the monaural signal and the side signal. LP inverse filter 121 performs LP inverse filtering on left signal L(n) using dequantized linear prediction coefficients $A_{dM}(z)$ of the monaural signal, to acquire left excitation signal $L_e(n)$. Time-domain left excitation signal $L_e(n)$ is transformed into a frequency-domain signal in T/F transformation section 122, to acquire frequency-domain left signal $L_e(f)$.

Further, dequantizer 123 dequantizes coded information $M_{qe}$, to acquire frequency-domain monaural signal $M_{de}(f)$.

With the present embodiment, spectrum split sections 124 and 125 divide the high frequency part of excitation signals $M_{de}(f)$ and $L_e(f)$ into a plurality of bands. Here, i=1, 2, . . . and $N_b$ represent an index showing band numbers, and $N_b$ represents the number of bands divided in the high frequency part.

Figure 3:
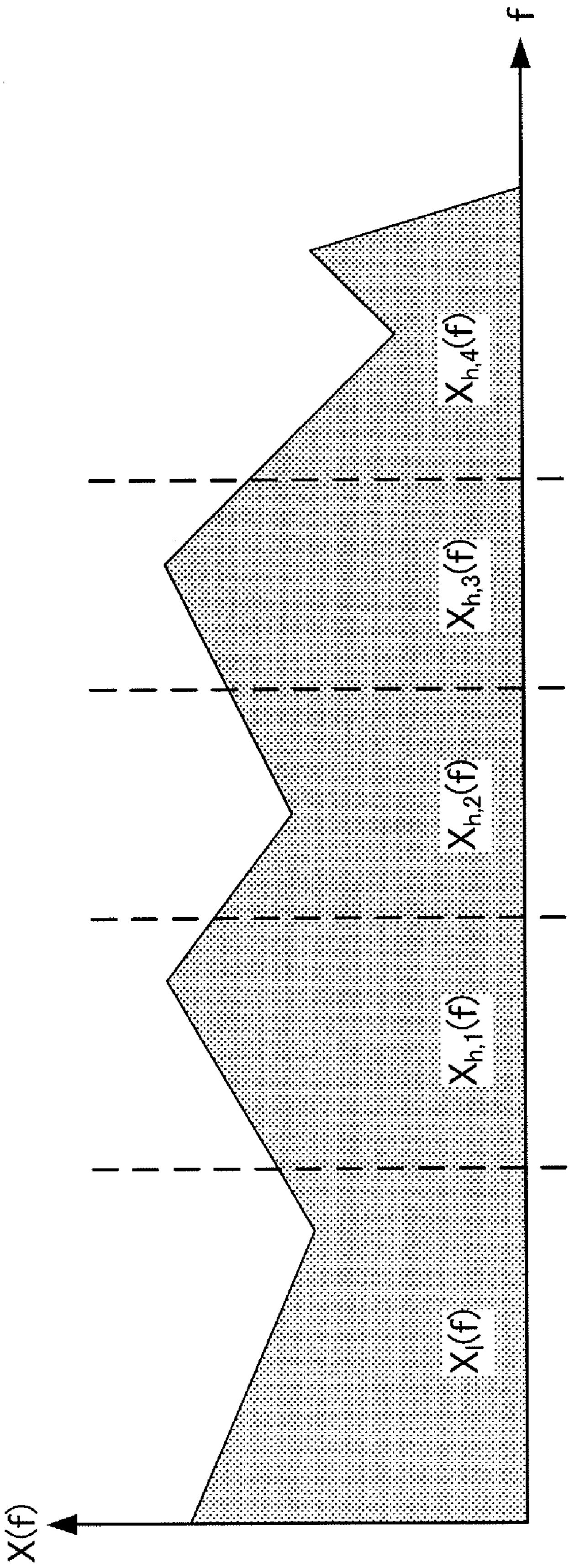
FIG. 3 illustrates a spectrum split process using arbitrary signal X(f)

FIG. 3 illustrates the spectrum division process using arbitrary signal X(f), and an example of $N_b$=4. Here, X(f) shows $M_{de}(f)$ or $L_e(f)$. Each band does not need to have the same spectral width. Each band i is characterized by a pair of scale factors $\alpha_i$ and $\beta_i$. Excitation signals of each band are represented by $M_{deh,i}(f)$ and $L_{eh,i}(f)$. Scale factor calculation sections 126 and 127 calculate the scale factors $\alpha_i$ and $\beta_i$ by following equation 7.

(Equation 7)

$$R_{eh,i}(f) = 2\cdot M_{deh,i}(f) - L_{eh,i}(f) \quad [7]$$

$$\alpha_i = \sqrt{\sum_{f\subset i} L_{eh,i}^2(f) \Big/ \sum_{f\subset i} M_{deh,i}^2(f)}$$

$$\beta_i = \sqrt{\sum_{f\subset i} R_{eh,i}^2(f) \Big/ \sum_{f\subset i} M_{deh,i}^2(f)}$$

Here, although right excitation signal $R_{eh,i}(f)$ in bands is calculated from the relations between monaural excitation signal $M_{deh,i}(f)$ and left excitation signal $L_{eh,i}(f)$ in the bands, the right excitation signal $R_{eh,i}(f)$ may be directly calculated in the LP inverse filter, the T/F transformation section and the spectrum split section as in the left signal.

The energy ratios are calculated in the excitation domain as shown in above equation 7, and shows ratios between the L/R signal and the monaural signal in a high frequency band (before LP inverse filtering). Consequently, dequantized linear prediction coefficients $Ad_M(z)$ of a monaural signal is used in the inverse filtering of the left signal.

Finally, quantizers 128 and 129 quantize scale factors $\alpha_i$ and $\beta_i$, to form quantized information $\alpha_{qi}$ and $\beta_{qi}$. Multiplexing section 130 multiplexes all quantized and encoded information, to form a bit stream.

In the decoding apparatus shown in FIG. 2, first, demultiplexing section 201 demultiplexes all bit stream information. Dequantizer 202 decodes monaural signal coded information $M_{qe}$, to form monaural signal $M_{de}(f)$ in the frequency domain. F/T transformation section 203 frequency-to-time transforms frequency-domain $M_{de}(f)$ to a time-domain signal, to recover monaural excitation signal $M_{de}(n)$.

Dequantizer 204 decodes and dequantizes coded information $A_{qM}$, to acquire linear prediction coefficients $A_{dM}(z)$. LP synthesis section 205 performs LP synthesis on $M_{de}(n)$ using linear prediction coefficients $A_{dM}(z)$, to recover monaural signal $M_d(n)$.

To enable intensity stereo to operate, spectrum split section 206 divides $M_{de}(f)$ into a plurality of frequency bands $M_{de1}(f)$ and $M_{deh,i}(f)$.

Dequantizer 207 decodes coded information $S_{qe1}$ of a low frequency side signal, to form low frequency side signal $S_{de1}(f)$. Dequantizer 208 decodes and dequantizes coded information $A_{qS}$, to form linear prediction coefficients $A_{dS}(z)$ for a side signal. Dequantizers 209 and 210 decode and dequantize quantized information $\alpha_{qi}$ and $\beta_{qi}$, to form scale factors $\alpha_i$ and $\beta_i$, respectively.

Scaling section 211 scales monaural signals $M_{deh,i}(f)$ in bands using scale factors $\alpha_{di}$ and $\beta_{di}$ shown in following equation 8, to acquire monaural signals $M_{deh2,i}(f)$ in bands after scaling.

(Equation 8)

$$M_{deh2,i}(f) = M_{deh,i}(f)\cdot\frac{\alpha_{di}+\beta_{di}}{2} \quad [8]$$

Further, scaling section 212 scales monaural signals $M_{deh,i}(f)$ in bands using scale factors $\alpha_{di}$ and $\beta_{di}$ shown in following equation 9, to acquire monaural signals $S_{deh,i}(f)$ in bands after scaling. $|A_{dS}(z)/A_{dM}(z)|$ in equation 9 represents the ratio of LP prediction gains between synthesis filters $1/A_{dM}(z)$ and $1/A_{dS}(z)$ for the corresponding frequency band represented by index i.

(Equation 9)

$$S_{deh,i}(f) = M_{deh,i}(f) \cdot \frac{\alpha_{di} - \beta_{di}}{2} \cdot \left| \frac{A_{dS}(z)}{A_{dM}(z)} \right| \quad [9]$$

Then, by assuming that following approximate equation 10 holds, following equation 11 shown in each unit of a high frequency spectrum band holds, and therefore the principle of intensity stereo holds, that is, by scaling monaural signals, it is possible to show that left and right signals having the same energy as the original signals are recovered. |A(z)| from frequency $f_1$ to $f_2$ can be estimated with following equation 12, where $f_s$ represents sampling frequency, N is an integer (e.g. 512), and $\Delta f=(f_2-f_1)/N$.

(Equation 10)

$$\frac{1}{A_S(z)} \cong \left| \frac{A_M(z)}{A_S(z)} \right| \frac{1}{A_M(z)} \quad [10]$$

(Equation 11)

$$\begin{aligned} L_h(z) &= \frac{M_{eh}(z)}{A_M(z)} + \frac{S_{eh}(z)}{A_S(z)} \\ &= \left(\frac{\alpha+\beta}{2} \cdot \frac{1}{A_M(z)} + \frac{\alpha-\beta}{2} \cdot \left| \frac{A_S(z)}{A_M(z)} \right| \cdot \frac{1}{A_S(z)}\right) M_{eh}(z) \\ &\cong \left(\frac{\alpha+\beta}{2} \cdot \frac{1}{A_M(z)} + \frac{\alpha-\beta}{2} \cdot \frac{1}{A_M(z)}\right) M_{eh}(z) \\ &= \alpha \cdot \frac{M_{eh}(z)}{A_M(z)} \\ &= \alpha \cdot M_h(z) \end{aligned} \quad [11]$$

and $$\begin{aligned} R_h(z) &= \frac{M_{eh}(z)}{A_M(z)} - \frac{S_{eh}(z)}{A_S(z)} \\ &= \left(\frac{\alpha+\beta}{2} \cdot \frac{1}{A_M(z)} - \frac{\alpha-\beta}{2} \cdot \left| \frac{A_S(z)}{A_M(z)} \right| \cdot \frac{1}{A_S(z)}\right) M_{eh}(z) \\ &\cong \left(\frac{\alpha+\beta}{2} \cdot \frac{1}{A_M(z)} - \frac{\alpha-\beta}{2} \cdot \frac{1}{A_M(z)}\right) M_{eh}(z) \\ &= \beta \cdot \frac{M_{eh}(z)}{A_M(z)} \\ &= \beta \cdot M_h(z) \end{aligned}$$

(Equation 12)

$$|A(z)| \approx \frac{1}{N} \sqrt{\sum_{n=0}^{N-1} |A(e^{j\pi(f_1+n\cdot\Delta f_x)})|^2} \quad [12]$$

The LP prediction gain can also be acquired by calculating energy of a band-pass filtered signal in the impulse response to the LP synthesis filter. Here, the band-pass filtering is performed using a band-pass filter which has a pass-band for the frequency band denoted by the corresponding band index i.

Combination section 213 combines low frequency monaural excitation signal $M_{de1}(f)$ with energy-adjusted monaural excitation signal $M_{deh2,i}(f)$, to form entire band excitation signal $M_{de2}(f)$. F/T transformation section 214 transforms frequency domain $M_{de2}(f)$ to time domain $M_{de2}(n)$. LP synthesis section 215 performs synthesis filtering on $M_{de2}(n)$ using linear prediction coefficients $A_{dM}(z)$, to recover energy-adjusted monaural signal $M_{d2}(n)$. Likewise, combination section 216 combines the low frequency part of the side signal $S_{de1}(f)$ and the high frequency part of the side signal $S_{deh,i}(f)$, to form $S_{de}(f)$. F/T transformation section 217 transforms frequency domain $S_{de}(f)$ to time domain $S_{de}(n)$. LP synthesis section 218 performs synthesis filtering on $S_{de}(n)$ using linear prediction coefficients $A_{ds}(z)$, to recover side signal $S_d(n)$.

When monaural signal $M_{d2}(n)$ and side signal $S_d(n)$ are recovered, adder 219 and subtractor 220 recover left and right signals, $L_{out}(n)$ and $R_{out}(n)$, as following equation 13.

[13]

$$L_{out}(n)=M_{d2}(n)+S_d(n)$$

$$R_{out}(n)=M_{d2}(n)-S_d(n) \quad \text{(Equation 13)}$$

In this way, according to the present embodiment, intensity stereo can be applied to high frequency spectrums, so that it is possible to improve the sound quality of stereo signals at low bit rates.

Further, according to the present embodiment, high frequency spectrum is divided into a plurality of bands and each band has a scale factor (i.e. an energy ratio between a left/right excitation signal and monaural excitation signals), so that it is possible to generate spectral characteristics in which differences between energy levels of stereo signals are more accurate and realize more accurate stereo sensation.

The types of the coding apparatus to use monaural coding are not limited to the present invention, and, any type of coding apparatus, for example, a TCX coding apparatus, other types of transform-coded apparatus, code excited linear prediction, may provide the same advantage as the present invention. Further, the coding apparatus according to the present invention may be a scalable coding apparatus (bit-rate scalable or band scalable), multiple-rate coding apparatus and variable rate coding apparatus.

Further, with the present invention, the number of intensity stereo bands may be only one (i.e. $N_b=1$).

Further, with the present invention, a set of $\alpha_{di}$ and $\beta_{di}$ may be quantized using vector quantization (VQ). This makes it possible to realize higher coding efficiency using the correlation between $\alpha_{di}$ and $\beta_{di}$.

Embodiment 2

With the present embodiment 2 of the present invention, to further reduce bit rates, use of linear prediction coefficients $A_s(z)$ of a side signal will be omitted, and, instead of $A_s(z)$, a case will be explained where linear prediction coefficients $A_M(z)$ for a monaural signal are used to process S(n).

Figure 4:
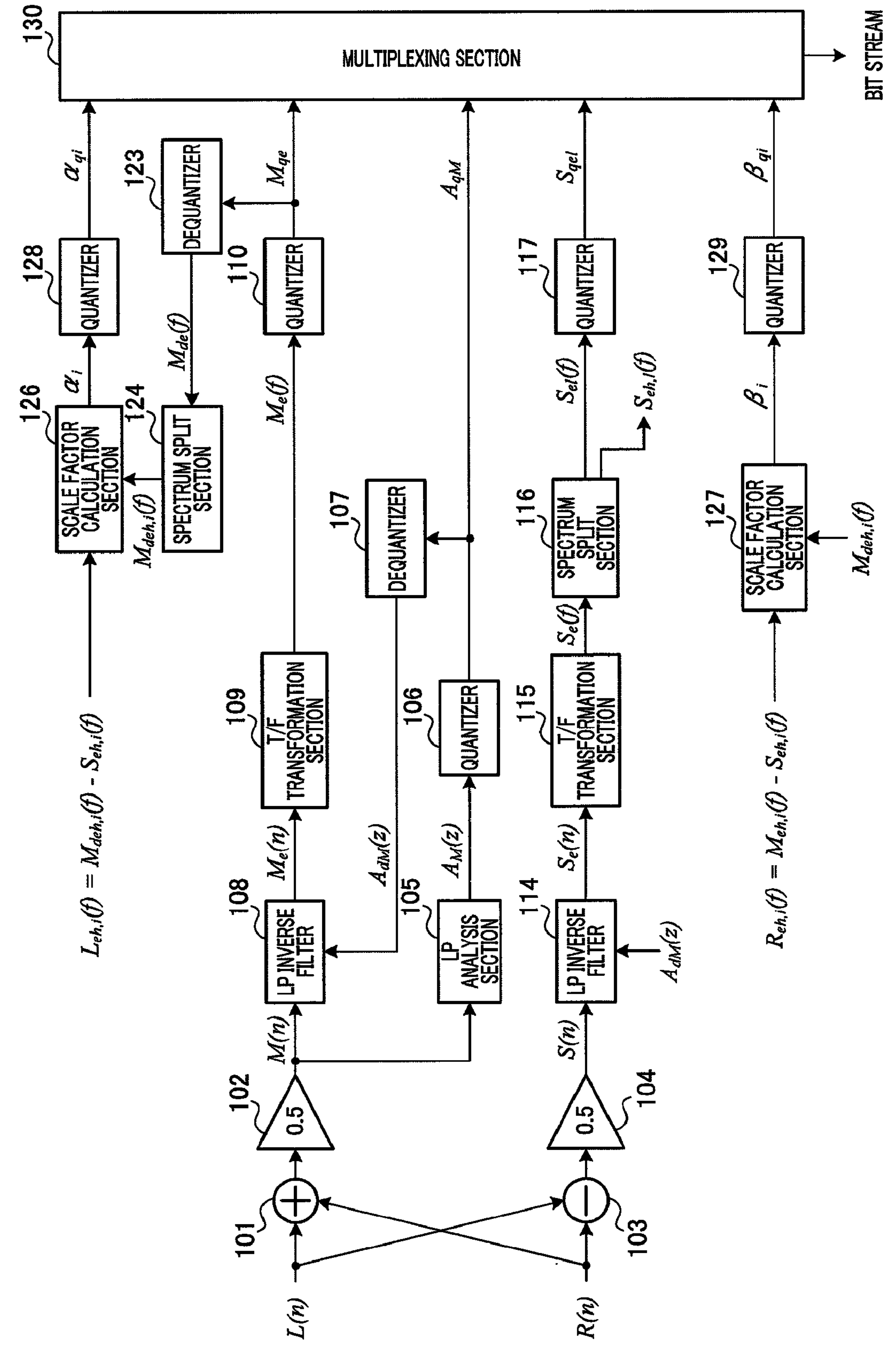
FIG. 4 is a block diagram showing a configuration of the coding apparatus according to Embodiment 2 of the present invention.

FIG. 4 shows a block diagram showing the configuration of the coding apparatus according to the present embodiment. In the coding apparatus in FIG. 4, the same reference numerals are assigned to the components in the coding apparatus shown in FIG. 1, and the explanation thereof in detail will be omitted.

Compared with the coding apparatus shown in FIG. 1, the coding apparatus shown in FIG. 4 adopts a configuration in which LP analysis section 111, quantizer 112 and dequantizer 113 are removed, and in which $A_{dM}(z)$ instead of $A_{dS}(z)$ is used for LP inverse filtering on S(n) in LP inverse filter 114.

Further, spectrum split section 116 outputs a high-frequency side excitation signal $S_{eh,i}(f)$.

Left excitation signal $L_{eh,i}(f)$ and right excitation signal $R_{eh,i}(f)$ in high frequencies are calculated using frequency-domain monaural excitation signal $M_{deh,i}(f)$ and frequency-domain side excitation signal $S_{eh,i}(f)$ shown in following equation 14 and utilizing relations between the left/right excitation signal and monaural excitation signal, and the side excitation signal.

[14]

$$L_{eh,i}(f)={}_{deh,i}(f)+S_{eh,i}(f)$$

$$R_{eh,i}(f)=M_{deh,i}(f)-S_{eh,i}(f) \qquad \text{(Equation 14)}$$

Figure 5:
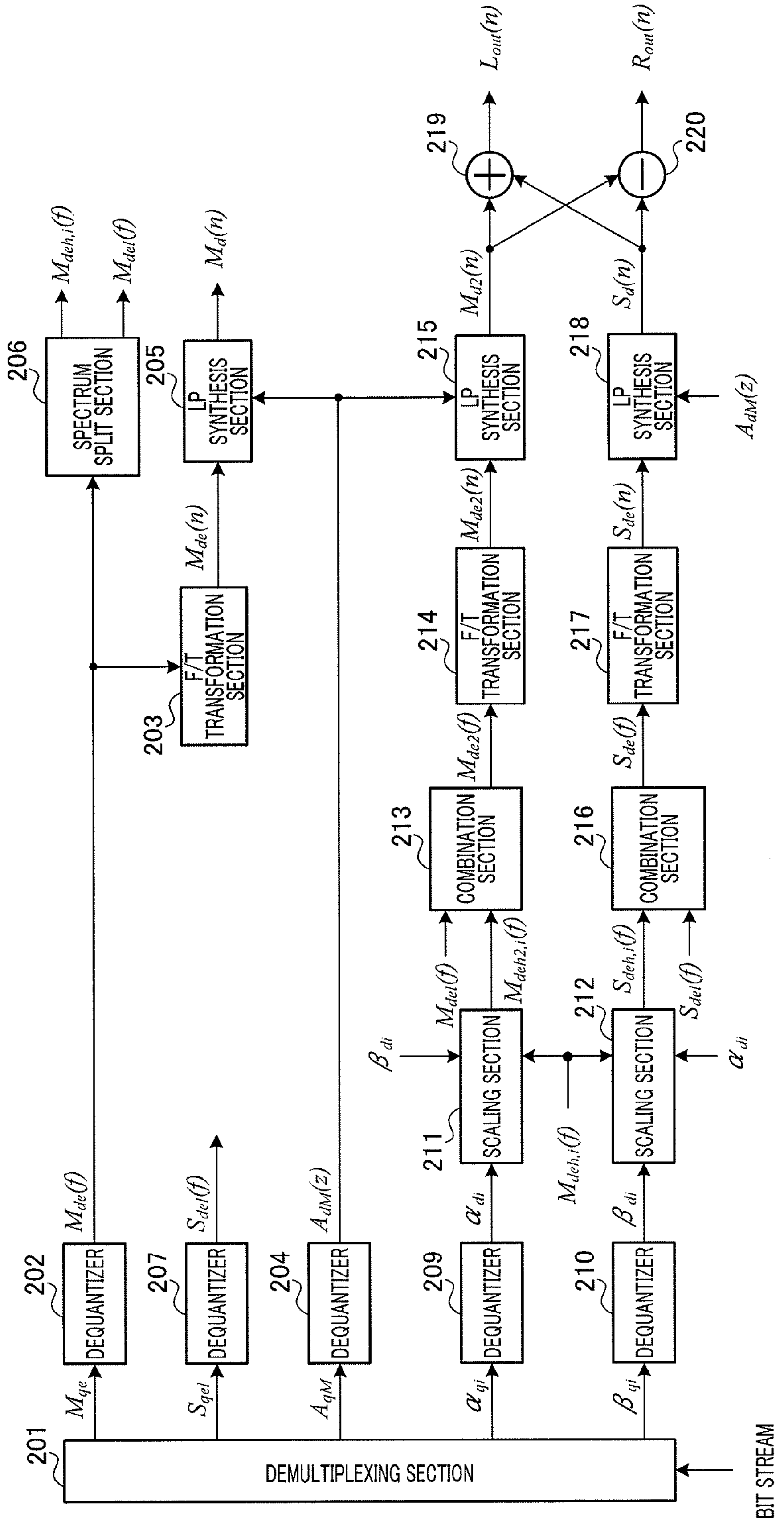
FIG. 5 is a block diagram showing a configuration of the decoding apparatus according to Embodiment 2 of the present invention.

FIG. 5 is a block diagram showing the configuration of the decoding apparatus according to the present embodiment. In the decoding apparatus in FIG. 5, the same reference numerals are assigned to the components in the coding apparatus shown in FIG. 2, and the explanation thereof in detail will be omitted.

Compared with the decoding apparatus shown in FIG. 2, the decoding apparatus shown in FIG. 5 adopts the configuration deleting dequantizer 208, and using $A_{dM}(z)$ for synthesis filtering on side excitation signal $S_{de}(n)$ in LP synthesis section 218 instead of $A_{dS}(z)$.

Further, the decoding apparatus shown in FIG. 5 differs from the decoding apparatus shown in FIG. 2 in scaling in scaling section 212, and monaural signal $M_{deh,i}(f)$ in each band is scaled using scale factors $\alpha_{di}$ and $\beta_{di}$ shown in following equation 15, to acquire side signal $S_{deh,i}(f)$ in each band after scaling.

(Equation 15)

$$S_{deh,i}(f) = M_{deh,i}(f)\cdot\frac{\alpha_{di}-\beta_{di}}{2} \qquad [15]$$

The principle of intensity stereo holds from following equation 16 shown in units of a high frequency spectrum band, (Equation 16)

$$\begin{aligned} L_h(z) &= \frac{M_{eh}(z)}{A_m(z)} + \frac{S_{eh}(z)}{A_s(z)} \\ &= \left(\frac{\alpha+\beta}{2}\cdot\frac{1}{A_m(z)} + \frac{\alpha-\beta}{2}\cdot\frac{1}{A_m(z)}\right)M_{eh}(z) \\ &= \alpha\cdot\frac{M_{eh}(z)}{A_m(z)} \\ &= \alpha\cdot M_h(z) \\ R_h(z) &= \frac{M_{eh}(z)}{A_m(z)} - \frac{S_{eh}(z)}{A_s(z)} \\ &= \left(\frac{\alpha+\beta}{2}\cdot\frac{1}{A_m(z)} - \frac{\alpha-\beta}{2}\cdot\frac{1}{A_m(z)}\right)M_{eh}(z) \\ &= \beta\cdot\frac{M_{eh}(z)}{A_m(z)} \\ &= \beta\cdot M_h(z) \end{aligned} \qquad [16]$$

In this way, according to the present embodiment, by omitting use of linear prediction coefficients $A_s(z)$ of a side signal and, instead of $A_s(z)$, by using linear prediction coefficients $A_m(z)$ for a monaural signal to process S(n), it is possible to further reduce bit rates.

Embodiment 3

With Embodiment 3 of the present invention, a case will be explained where the present invention is applicable to not only TCX-based codecs, but arbitrary codecs that encode monaural and side signals in the frequency domain.

With Embodiment 3 of the present invention, a case will be explained where intensity stereo is applied to a coding apparatus and a decoding apparatus based on monaural signals and side signals (instead of monaural excitation signals and side excitation signals).

Figure 6:
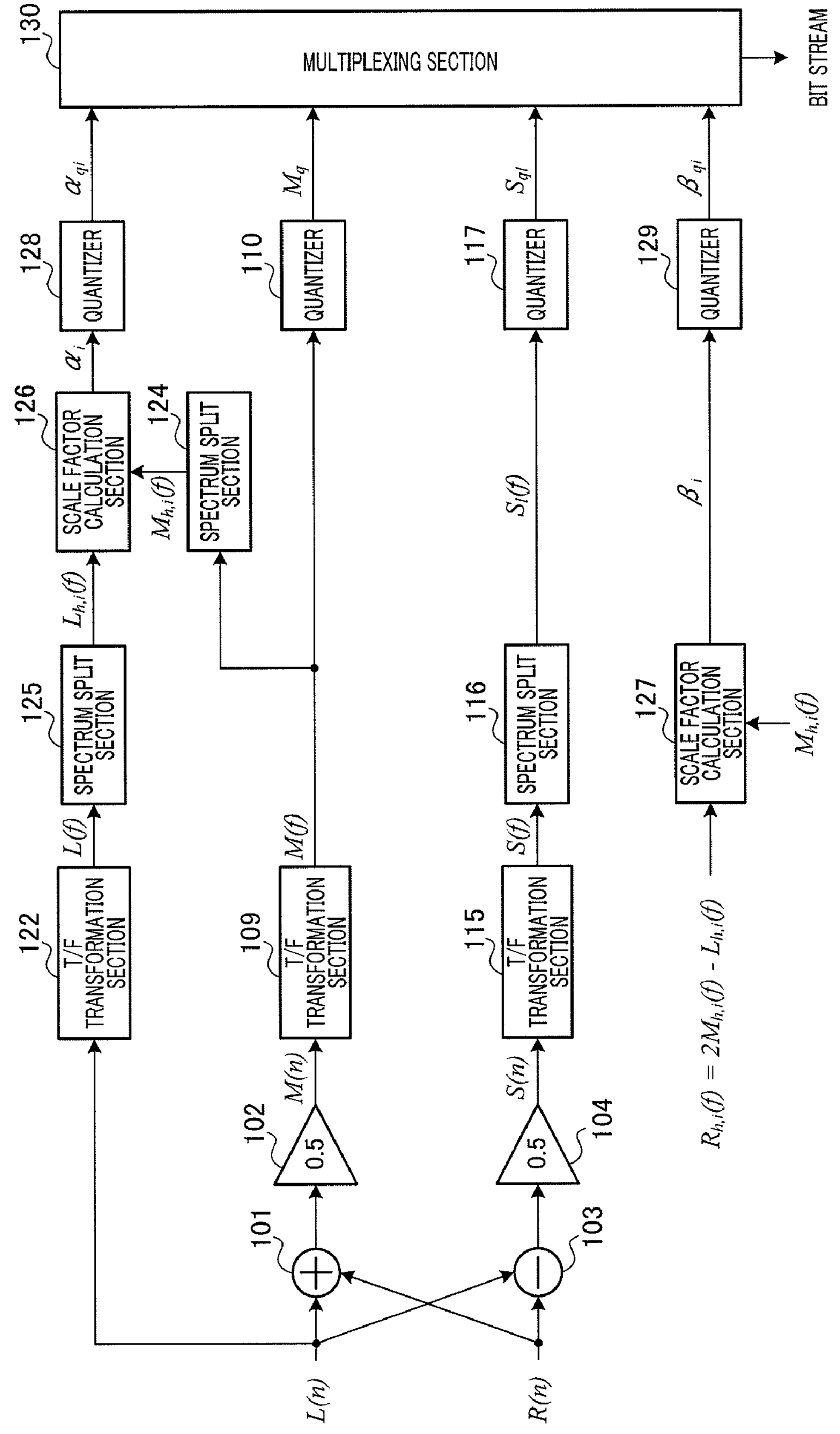
FIG. 6 is a block diagram showing a configuration of the coding apparatus according to Embodiment 3 of the present invention.

FIG. 6 is a block diagram showing the configuration of the coding apparatus according to the present embodiment. In the coding apparatus in FIG. 6, the same reference numerals are assigned to the components in the coding apparatus shown in FIG. 1, and the explanation thereof in detail will be omitted.

Compared with the coding apparatus shown in FIG. 1, the coding apparatus shown in FIG. 6 adopts a configuration in which all the blocks related to linear prediction (reference numerals 105, 106, 107, 108, 111, 112, 113, 114 and 121) are removed, and adopts the same operations as shown in FIG. 1 of Embodiment 1 other than the removed parts.

Figure 7:
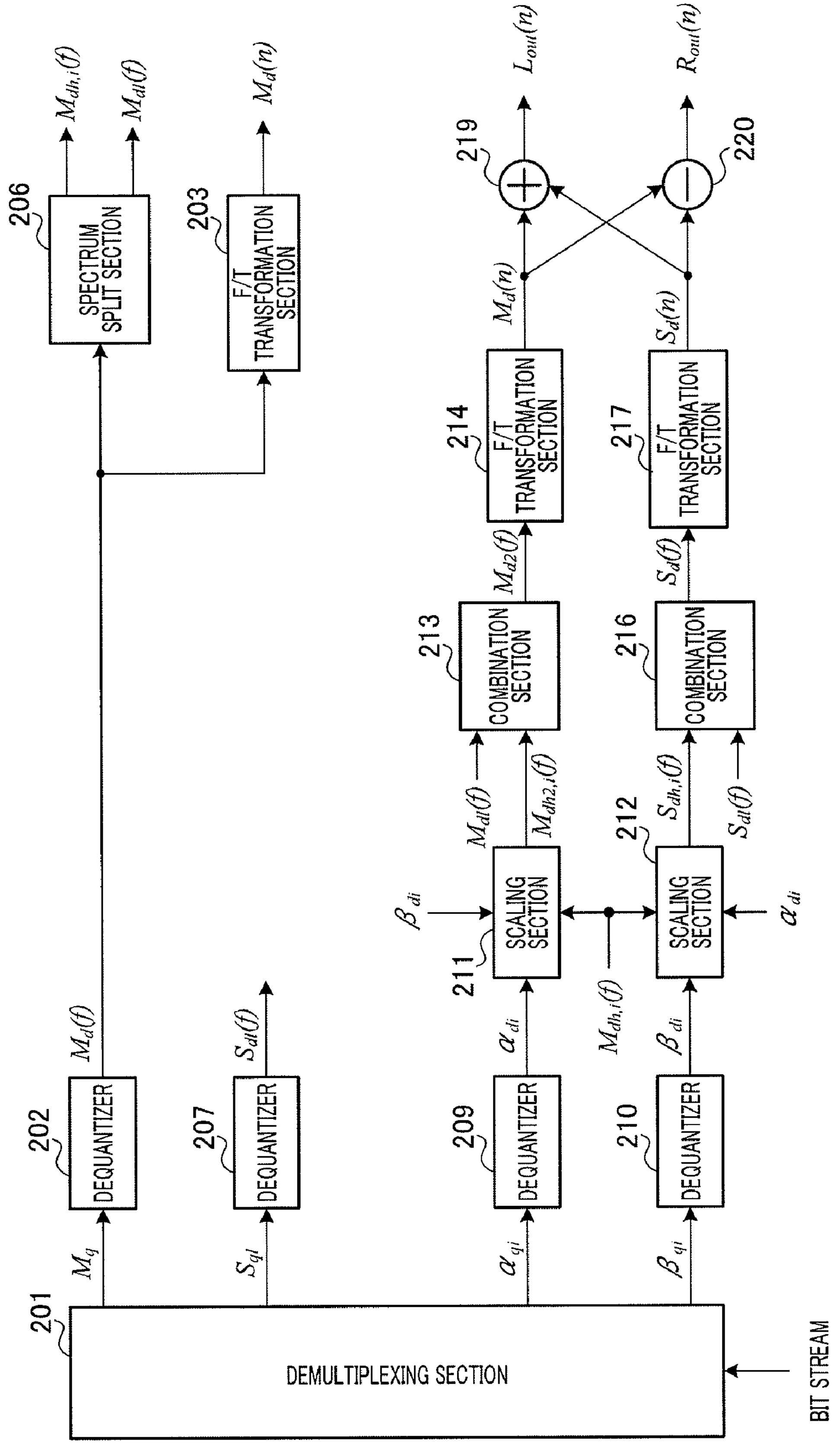
FIG. 7 is a block diagram showing a configuration of the decoding apparatus according to Embodiment 3 of the present invention.

FIG. 7 is a block diagram showing the configuration of the decoding apparatus according to the present embodiment. In the decoding apparatus in FIG. 7, the same reference numerals are assigned to the components in the coding apparatus shown in FIG. 2, and the explanation thereof in detail will be omitted. Compared with the decoding apparatus shown in FIG. 2, the decoding apparatus shown in FIG. 7 adopts a configuration in which dequantizers 207 and 208, and LP synthesis sections 205, 215 and 218 are removed.

Further, the decoding apparatus shown in FIG. 7 differs from the decoding apparatus shown in FIG. 2 in scaling in scaling sections 211 and 212, and the scaling shown in following equations 17 and 18 is performed, respectively.

(Equation 17)

$$M_{dh2,i}(f) = M_{dh,i}(f)\cdot\frac{\alpha_{di}+\beta_{di}}{2} \qquad [17]$$

(Equation 18)

$$S_{dh,i}(f) = M_{dh,i}(f)\cdot\frac{\alpha_{di}-\beta_{di}}{2} \qquad [18]$$

The operations other than those are the same as shown in FIG. 2.

In this way, according to the present embodiment, it is possible to apply intensity stereo to all codecs that encode monaural and side signals in the frequency domain. According to the present invention, by scaling recovered monaural excitation signals in the frequency domain, intensity stereo is indirectly applied to side excitation in the frequency domain, so that it is possible not to increase the additional amount of calculation required of when the left and right signals are directly generated by scaling and not to produce additional delay accompanied by time-to-frequency transformation and frequency-to-time transformation.

Embodiment 4

With the coding apparatus (FIG. 1) in which intensity stereo is combined with TCX coding explained in Embodiment 1, to calculate energy ratios $\alpha_i$ and $\beta_i$ (i=1, 2, . . . and $N_b$), it is necessary to transform time domain excitation signals to frequency domain excitation signals.

By contrast with this, with Embodiment 4, a case will be explained as a simpler method, where a low-order bandpass filter is used every band.

Figure 8:
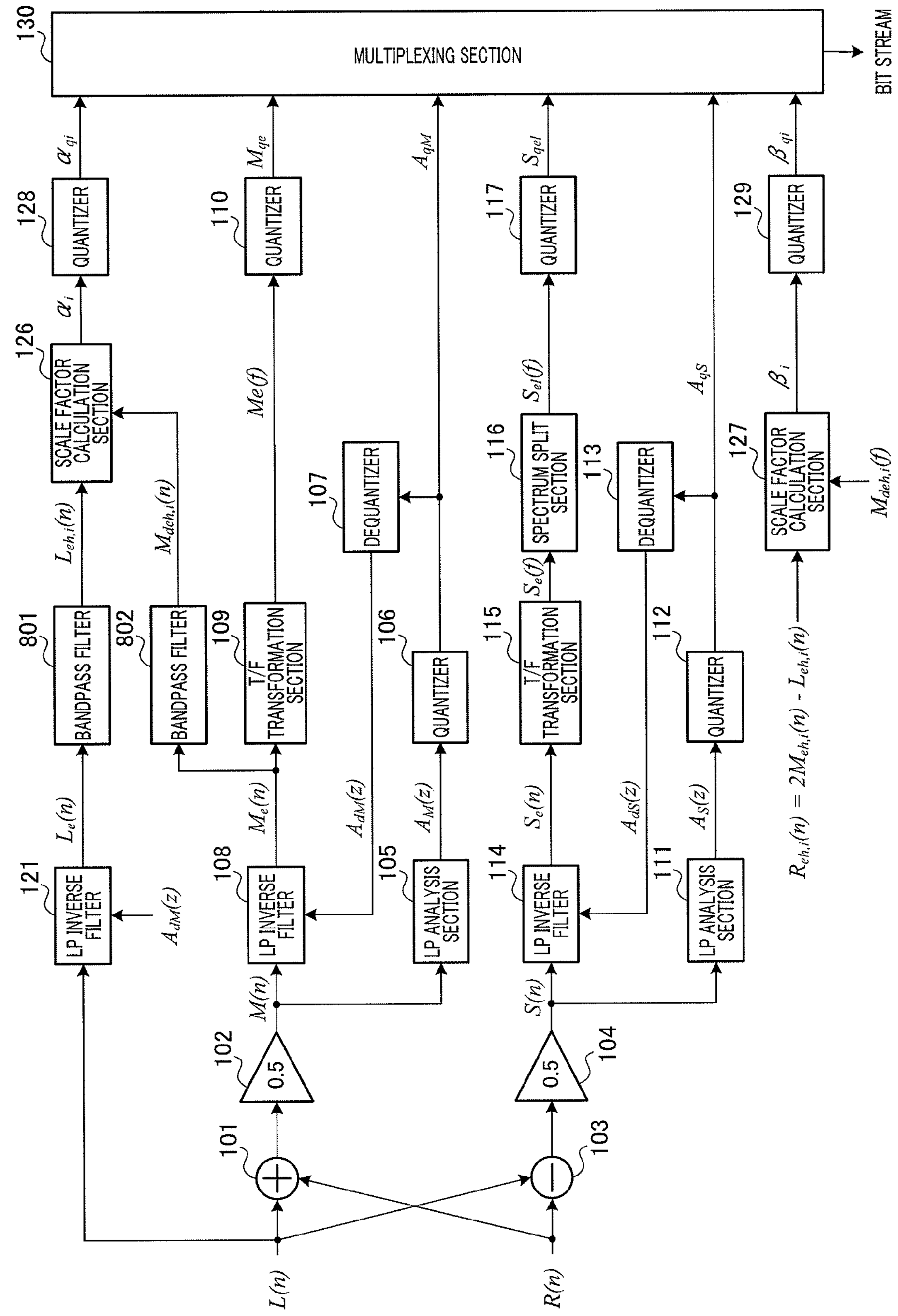
FIG. 8 is a block diagram showing a configuration of the coding apparatus according to Embodiment 4 of the present invention.
Figure 9:
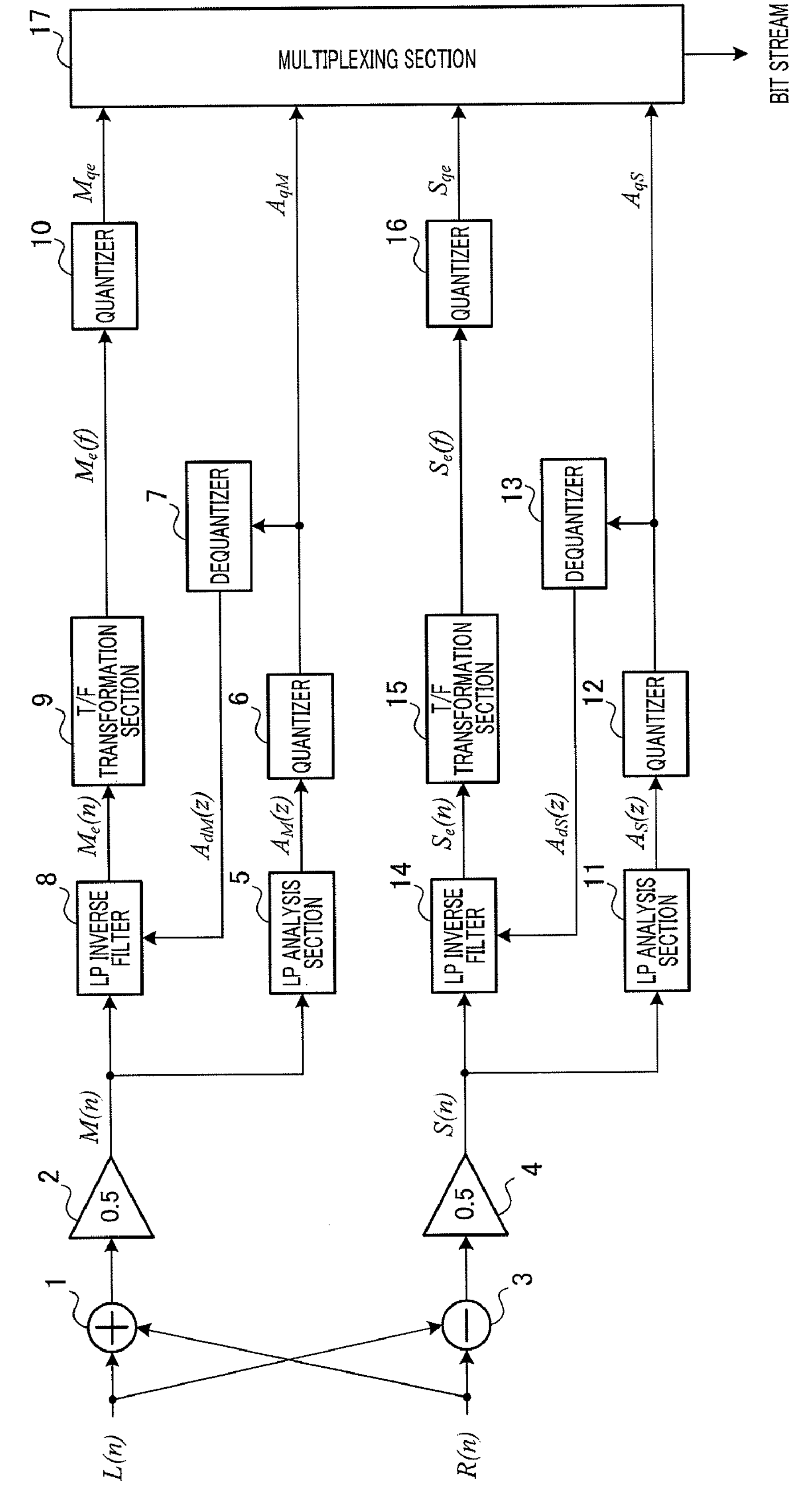
FIG. 9 is a block diagram showing a configuration of the general coding apparatus of transform-coded excitation codecs.
Figure 10:
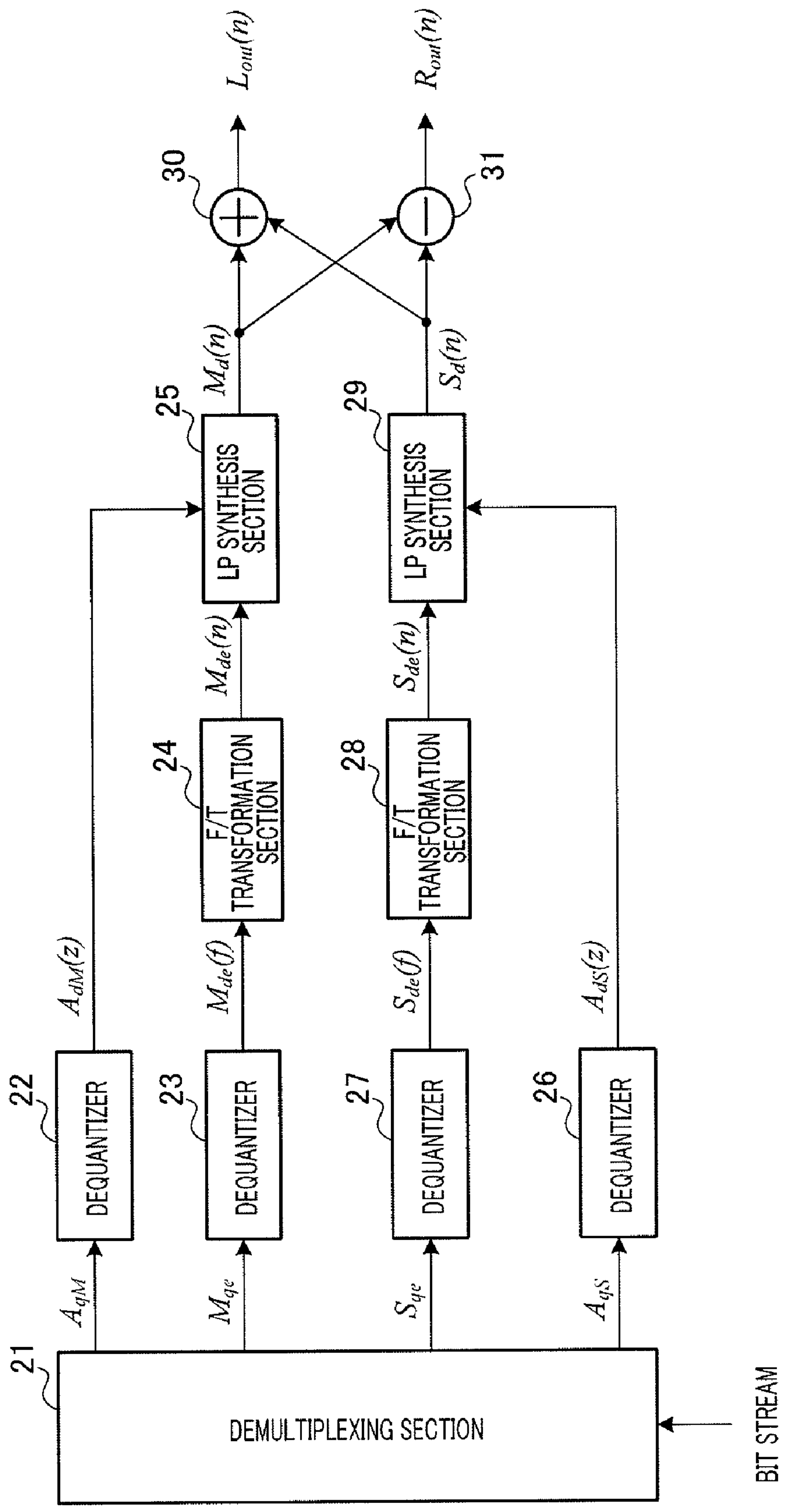
FIG. 10 is a block diagram showing a configuration of the general decoding apparatus of transform-coded excitation codecs.
Figure 11:
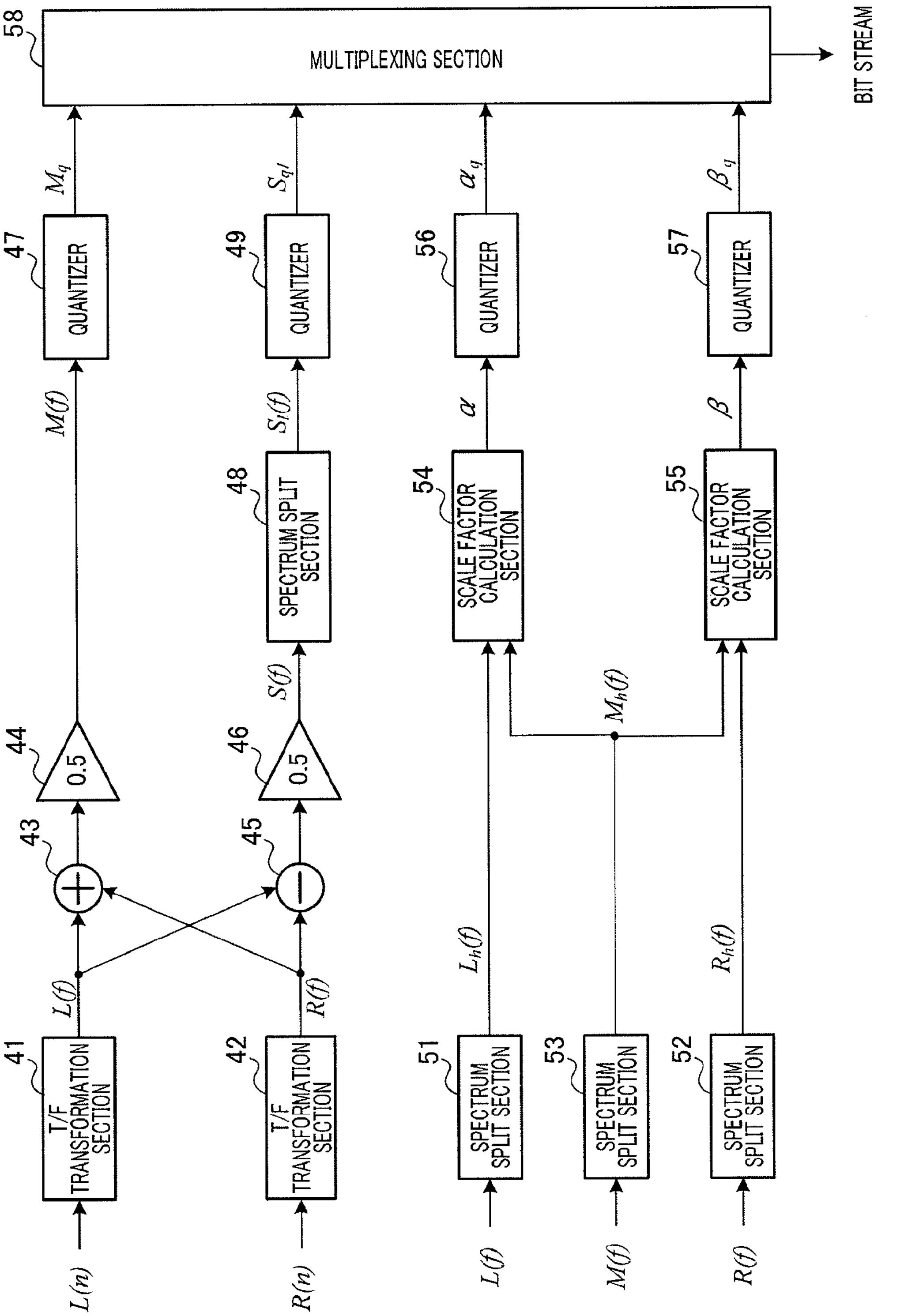
FIG. 11 a block diagram showing a configuration of the general coding apparatus using intensity stereo.
Figure 12:
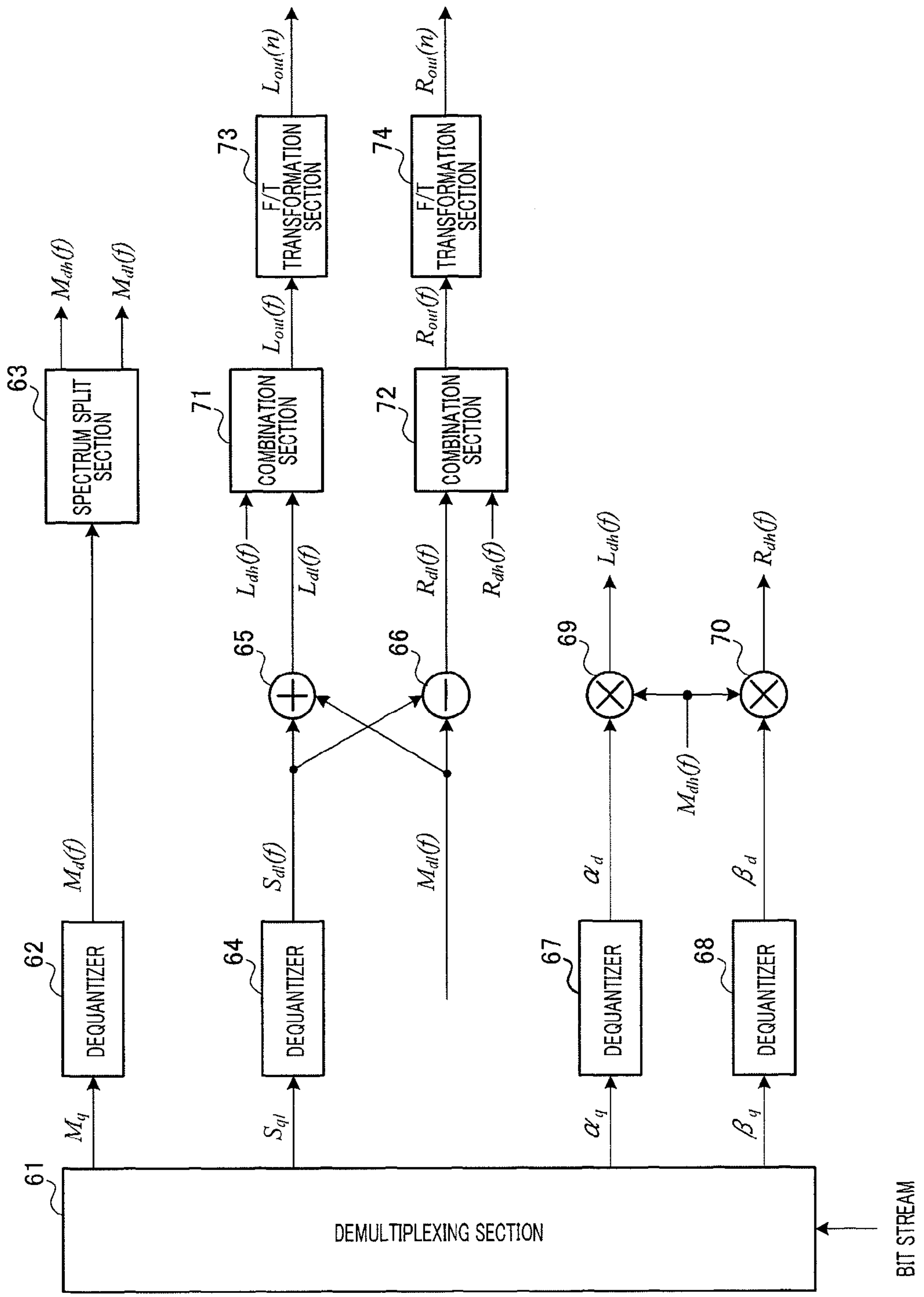
FIG. 12 a block diagram showing a configuration of the general coding apparatus using intensity stereo.

FIG. 8 is a block diagram showing the configuration of the coding apparatus according to the present embodiment. In the coding apparatus in FIG. 8, the same reference numerals are assigned to the components in the coding apparatus shown in FIG. 1, and the explanation thereof in detail will be omitted.

Compared with the coding apparatus shown in FIG. 1, the coding apparatus shown in FIG. 8 adopts a configuration in which T/F transformation section 122, dequantizer 123 and spectrum split sections 124 and 125 are removed, and instead, adding bandpass filters 801 and 802.

By passing left excitation signal $L_e(n)$ through bandpass filter 801 supporting each band, left excitation signals $L_{eh,i}(n)$ per high frequency band i are extracted. Further, by passing monaural excitation signal $M_e(n)$ through bandpass filter 802 supporting each band, monaural excitation signals $M_{deh,i}(n)$ per high frequency band i are extracted.

According to the present embodiment, energy ratios $\alpha_i$ and $\beta_i$ are calculated in the time domain in scale factor calculation sections 126 and 127 as shown in following equation 19.

(Equation 19)

$$\alpha_i = \sqrt{\sum L_{eh,i}^2(n) / \sum M_{deh,i}^2(n)} \quad [19]$$

$$\beta_i = \sqrt{\sum R_{eh,i}^2(n) / \sum M_{deh,i}^2(n)}$$

In this way, according to the present embodiment, by using a low-order bandpass filter per band instead of time-to-frequency transformation, it is possible to reduce the amount of calculation accompanied by eliminating the need of time-to-frequency transformation.

If there is only one intensity stereo band ($N_b$=1), one high-pass filter is only used.

Further, with the present embodiment, the energy ratios can be directly calculated from bandpass filtered signals using input left signal L(n) (or right signal R(n)) and input monaural signal M(n), without passing a LP inverse filter.

Embodiments of the present invention have been explained.

In all embodiments from Embodiment 1 to Embodiment 4 described above, it is clear that left signal (L) and right signal (R) may be reversed, that is, the left signal may be replaced with the right signal and the right signal may be replaced with the left signal.

Examples of preferred embodiments of the present invention have been described above, and the scope of the present invention is by no means limited to the above-described embodiments. The present invention is applicable to any system having a coding apparatus and a decoding apparatus.

The coding apparatus and the decoding apparatus according to the present invention can be provided in a communication terminal apparatus and base station apparatus in a mobile communication system, so that it is possible to provide a communication terminal apparatus, base station apparatus and mobile communication system having same advantages and effects as described above.

Further, although cases have been described with the above embodiment as examples where the present invention is configured by hardware, the present invention can also be realized by software. For example, it is possible to implement the same functions as in the base station apparatus according to the present invention by describing algorithms of the radio transmitting methods according to the present invention using the programming language, and executing this program with an information processing section by storing in memory.

Each function block employed in the description of each of the aforementioned embodiments may typically be implemented as an LSI constituted by an integrated circuit. These may be individual chips or partially or totally contained on a single chip.

"LSI" is adopted here but this may also be referred to as "IC," "system LSI," "super LSI," or "ultra LSI" depending on differing extents of integration.

Further, the method of circuit integration is not limited to LSIs, and implementation using dedicated circuitry or general purpose processors is also possible. After LSI manufacture, utilization of a programmable FPGA (Field Programmable Gate Array) or a reconfigurable process or where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2007-285607, filed on Nov. 1, 2007, including the specification, drawings and abstract, is incorporated herein by reference in its entirety.

INDUSTRIAL APPLICABILITY

The coding apparatus and the coding method according to the present invention is suitable for use in mobile phones, IP phones, video conferences and so on.

The invention claimed is:

1. A coding apparatus comprising:

a monaural signal generation processor that generates a time-domain monaural signal by combining a first channel signal and a second channel signal in an input stereo signal and generates a time-domain side signal, which is a difference between the first channel signal and the second channel signal;

a first transformation processor that transforms the time-domain monaural signal to a frequency-domain monaural signal;

a second transformation processor that transforms the time-domain side signal to a frequency-domain side signal;

a first quantizer that quantizes the frequency-domain monaural signal, to acquire a first quantization value;

a second quantizer that quantizes a low frequency part of the frequency-domain side signal, the low frequency part being equal to or lower than a predetermined frequency of the frequency-domain side signal, to acquire a second quantization value;

a first scale factor calculator that calculates, in the frequency domain, a first energy ratio between a high frequency part of a frequency-domain first channel signal that is higher than a predetermined frequency of the frequency-domain first channel signal and a high frequency part of a frequency-domain monaural signal that is higher than a predetermined frequency of the frequency-domain monaural signal;

a second scale factor calculator that calculates, in the frequency domain, a second energy ratio between a high frequency part of a frequency-domain second channel signal that is higher than a predetermined frequency of the frequency-domain second channel signal and a high frequency part of a frequency-domain monaural signal that is higher than a predetermined frequency of the frequency-domain monaural signal;

a third quantizer that quantizes the first energy ratio to acquire a third quantization value;

a fourth quantizer that quantizes the second energy ratio to acquire a fourth quantization value; and a transmitter that transmits the first quantization value, the second quantization value, the third quantization value and the fourth quantization value.

2. The coding apparatus according to claim 1, further comprising:

a first linear prediction analyzer that performs a linear prediction analysis on the monaural signal, to acquire a first linear prediction coefficient; and a fifth quantizer that quantizes the first linear prediction coefficient, to acquire a fifth quantization value, wherein the transmitter also transmits the fifth quantization value.

3. The coding apparatus according to claim 2, further comprising:

a second linear prediction analyzer that performs a linear prediction analysis on the side signal to acquire a second linear prediction coefficient; and a sixth quantizer that quantizes the second linear prediction coefficient, to acquire a sixth quantization value, wherein the transmitter also transmits the sixth quantization value.

4. The coding apparatus according to claim 1, further comprising:

a first filter that passes only the high frequency part of the time-domain first channel signal; and a second filter that passes only the high frequency part of the time-domain monaural signal.

5. A decoding apparatus comprising:

a receiver that receives:

a first quantization value acquired by transforming a monaural signal to a frequency-domain monaural signal and quantizing the frequency-domain monaural signal generated by combining a first channel signal and a second channel signal in an input stereo signal;

a second quantization value acquired by transforming a side signal to a frequency-domain side signal and quantizing a low frequency part of the frequency-domain side signal that is equal to or lower than a predetermined frequency of the frequency-domain side signal, the side signal being a difference between the first channel signal and the second channel signal;

a third quantization value acquired by quantizing a first energy ratio, the first energy ratio being a ratio between high frequency part of a frequency-domain first channel signal that is higher than a predetermined frequency of the frequency-domain first channel signal and a high frequency part of the frequency-domain monaural signal that is higher than a predetermined frequency of the frequency-domain monaural signal; and a fourth quantization value acquired by quantizing a second energy ratio, the second energy ratio being a ratio between high frequency part of a frequency-domain second channel signal that is higher than a ratio between predetermined frequency of the frequency-domain second channel signal is and the high frequency part of the frequency-domain monaural signal that is higher than the predetermined frequency of the frequency-domain monaural signal;

a first decoder that decodes the frequency-domain monaural signal from the first quantization value;

a second decoder that decodes the low frequency part of the frequency-domain side signal from the second quantization value;

a third decoder that decodes the first energy ratio from the third quantization value;

a fourth decoder that decodes the second energy ratio from the fourth quantization value;

a first scaling processor that scales the high frequency part of the frequency-domain monaural signal using the first energy ratio and the second energy ratio, to generate a scaled monaural signal;

a second scaling processor that scales the high frequency part of the frequency-domain monaural signal using the first energy ratio and the second energy ratio, to generate a scaled side signal;

a third transformation processor that transforms a combined signal of the scaled monaural signal and the low frequency part of the frequency-domain monaural signal to a time-domain monaural signal;

a fourth transformation processor that transforms a combined signal of the scaled side signal and the low frequency part of the frequency-domain side signal to a time-domain side signal; and a decoder that decodes a first channel signal and a second channel signal in a stereo signal using the time-domain monaural signal acquired in the third transformation processor and the time-domain side signal acquired in the fourth transformation processor, wherein the first scaling processor and the second scaling processor perform scaling using the first energy ratio and the second energy ratio such that the decoded first channel signal and the decoded second channel signal in the stereo signal have approximately the same energy as a first channel signal and a second channel signal in an input stereo signal.

6. A coding method, performed by a processor, comprising:

generating a time-domain monaural signal by combining a first channel signal and a second channel signal in an input stereo signal and generating a time-domain side signal, which is a difference between the first channel signal and the second channel signal;

transforming the time-domain monaural signal to a frequency-domain monaural signal;

transforming the time-domain side signal to a frequency-domain side signal;

quantizing the frequency-domain monaural signal, to acquire a first quantization value;

quantizing a low frequency part of the frequency-domain side signal, the low frequency part being equal to or lower than a predetermined frequency of the frequency-domain side signal, to acquire a second quantization value;

calculating, by a processor, a first energy ratio between a high frequency part of a frequency-domain first channel signal that is higher than a predetermined frequency of the frequency-domain first channel signal and a high frequency part of a frequency-domain monaural signal that is higher than a predetermined frequency of the frequency-domain monaural signal;

calculating, by a processor, a second energy ratio between a high frequency part of a frequency-domain second channel signal that is higher than a predetermined frequency of the frequency-domain second channel signal and a high frequency part of a frequency-domain monaural signal that is higher than a predetermined frequency of the frequency-domain monaural signal;

quantizing the first energy ratio to acquire a third quantization value;

quantizing the second energy ratio to acquire a fourth quantization value; and transmitting the first quantization value, the second quantization value, the third quantization value and the fourth quantization value.

7. A decoding method, performed by a processor, comprising: receiving:

a first quantization value acquired by transforming a monaural signal to a frequency-domain monaural signal and quantizing the frequency-domain monaural signal generated by combining a first channel signal and a second channel signal in an input stereo signal;

a second quantization value acquired by transforming a side signal to a frequency-domain side signal and quantizing a low frequency part of the frequency-domain side signal that is equal to or lower than a predetermined frequency of the frequency-domain side signal, the side signal being a difference between the first channel signal and the second channel signal;

a third quantization value acquired by quantizing a first energy ratio, the first energy ratio being a ratio of high frequency part of a frequency-domain first channel signal that is higher than a predetermined frequency of the frequency-domain first channel signal to a high frequency part of the frequency-domain monaural signal that is higher than a predetermined frequency of the frequency-domain monaural signal; and a fourth quantization value acquired by quantizing a second energy ratio, the second energy ratio being a ratio of a high frequency part of a frequency-domain second channel signal that is higher than a predetermined frequency of the frequency-domain second channel signal to the high frequency part of the frequency-domain monaural signal that is higher than the predetermined frequency of the frequency-domain monaural signal;

decoding, by a processor, the frequency-domain monaural signal from the first quantization value;

decoding, by a processor, the low frequency part of the frequency-domain side signal i from the second quantization value;

decoding, by a processor, the first energy ratio from the third quantization value;

decoding, by a processor, the second energy ratio from the fourth quantization value;

a first scaling, by a processor, of the high frequency part of the frequency-domain monaural signal using the first energy ratio and the second energy ratio, to generate a scaled monaural signal a second scaling, by a processor, of the high frequency part of the frequency-domain monaural signal using the first energy ratio and the second energy ratio, to generate a scaled side signal;

transforming a first combined signal of the scaled monaural signal and the low frequency part of the frequency-domain monaural signal to a time-domain monaural signal;

transforming a second combined signal of the scaled side signal and the low frequency part of the frequency-domain side signal to a time-domain side signal; and decoding, by a processor, a first channel signal and a second channel signal in a stereo signal using the time-domain monaural signal acquired in the transforming of the first combined signal and the time-domain side signal acquired in the transforming of the second combined signal, wherein, the first scaling and the second scaling are performed using the first energy ratio and the second energy ratio such that the decoded first channel signal and the decoded second channel signal in the stereo signal have approximately the same energy as a first channel signal and a second channel signal in an input stereo signal.

* * * * *